UNITED STATES PATENT OFFICE.

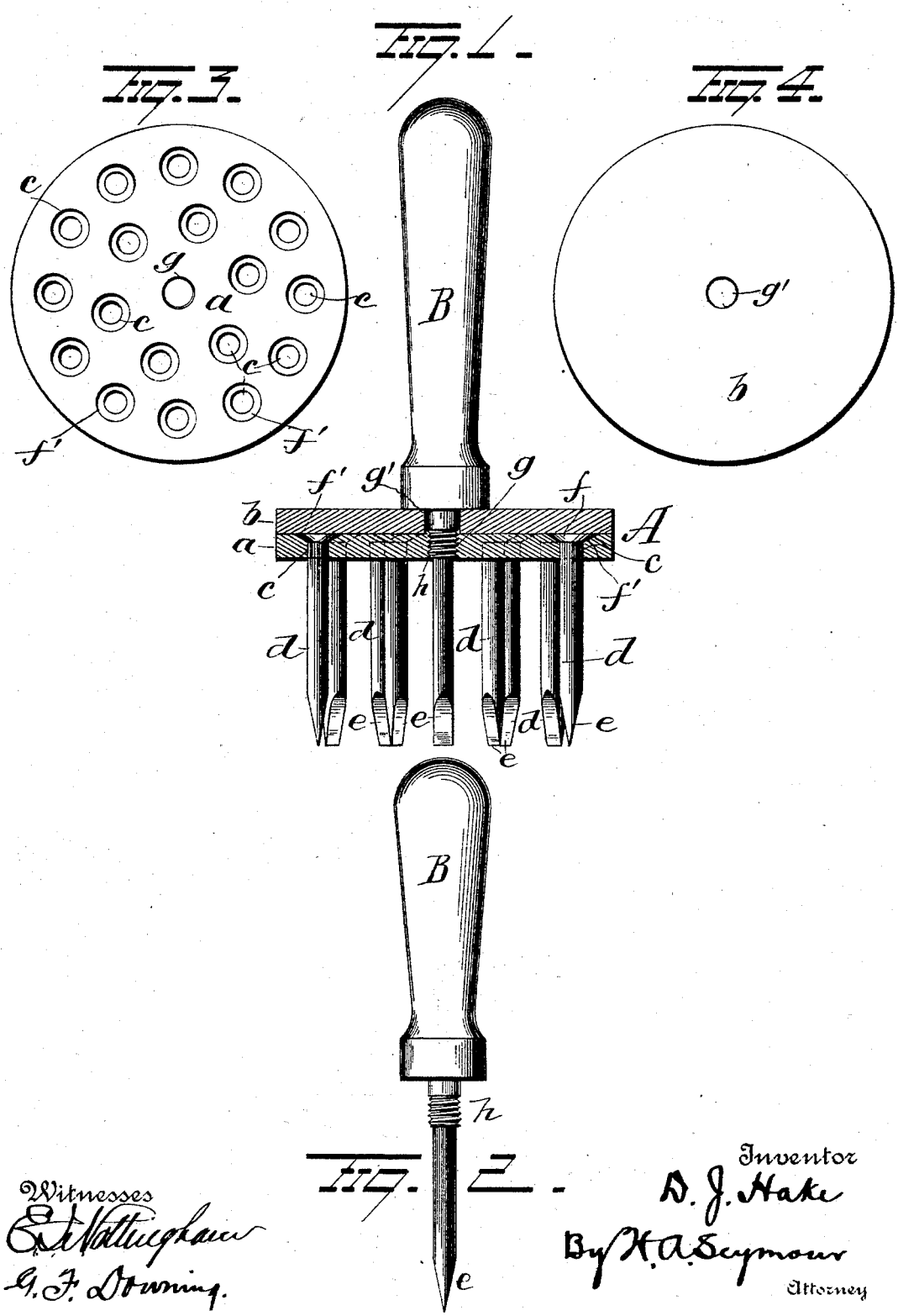

DANIEL J. HAKE, OF MIDDLETOWN, PENNSYLVANIA.

MEAT-TENDERER.

SPECIFICATION forming part of Letters Patent No. 524,436, dated August 14, 1894.

Application filed October 18, 1893. Serial No. 488,530. (No model.)

*To all whom it may concern:*

Be it known that I, DANIEL J. HAKE, a resident of Middletown, in the county of Dauphin and State of Pennsylvania, have invented certain new and useful Improvements in Meat-Tenderers; and I do hereby declare the following to be a full, clear, and exact description of the invention, such as will enable others skilled in the art to which it appertains to make and use the same.

My invention relates to an improvement in meat tenderers,—the object of the invention being to produce a device of the class specified which shall be simple in construction, comparatively cheap to manufacture, easy to assemble and disassemble, readily cleaned and which shall be effectual in the performance of its functions.

With this object in view the invention consists in certain novel features of construction and combinations and arrangements of parts as hereinafter set forth and pointed out in the claims.

In the accompanying drawings, Figure 1 is a sectional view of my improved meat tenderer ready for use. Figs. 2, 3, and 4 are detail views of the handle and one of the knives projecting therefrom and plates.

The body portion A of my improved device comprises two plates, $a$, $b$, preferably circular in form. The plate $a$ is provided with a number of perforations $c$ for the accommodation of a number of pins $d$, which project downwardly from said plate and at their lower ends are beveled to produce cutting edges $e$, thus producing, in effect, knives. The pins or knives $d$ are provided at their upper ends with heads $f$, which normally rest in countersinks $f'$ in the upper face of the plate $a$. The pins or knives $d$ are passed loosely through the perforations in the plate $a$ so that they can be readily removed when it is desired to clean them. In order to retain the pins or knives in place, the plate $b$ is placed over their heads, said plate $b$ resting flat upon and parallel with the plate $a$. In the center of the plate $a$ a screw threaded perforation $g$ is made, and in the plate $b$ a plain perforation $g'$ is made, said perforations being in alignment with each other. Through these perforations, the shank $h$ of a handle B is adapted to pass, the portion of said shank which passes through the plate $a$ being screw threaded whereby to secure said plates together and the pins or knives properly in place. Beyond the screw threaded portion of the shank, the same is extended and constitutes the central knife of the device.

From the above construction and arrangement of parts it will be seen that the device may be easily and quickly disassembled and the knives cleaned, and that it may be as quickly and readily assembled, when it will produce a meat tenderer which will properly cut the grain of the meat and which will be effectual, in every respect, in the performance of its functions.

Having fully described my invention, what I claim as new, and desire to secure by Letters Patent, is—

1. As an article of manufacture, a meat tenderer consisting of a pair of plates or disks, removable knives connected with one plate and retained therein by the other plate, and a removable handle having a knife on one end, said handle constructed to hold the two plates together, substantially as set forth.

2. In a meat tenderer, the combination with two parallel plates, one of said plates having a series of perforations therein, of a series of knives projecting through said perforations, a handle, and a shank projecting from said handle and having a screw-threaded portion adapted to screw into said perforated plate, substantially as set forth.

3. In a meat tenderer, the combination with two parallel plates having aligned perforations, the perforation in one of said plates being screwthreaded, of knives removably connected with the latter plate, a handle, a shank projecting from said handle and adapted to project through said perforations in the plates and constitute the central knife of the device and screw-threads on said shank adapted to mesh with the screw threads in the perforation in the plate carrying the knives, substantially as set forth.

In testimony whereof I have signed this specification in the presence of two subscribing witnesses.

DANIEL J. HAKE.

Witnesses:
JOHN L. WHIRLES,
ALBERT THOMAS.